United States Patent
Cho et al.

(10) Patent No.: US 11,266,953 B2
(45) Date of Patent: Mar. 8, 2022

(54) REVERSE OSMOSIS FILTERING MODULE AND REVERSE OSMOSIS FILTER COMPRISING SAME

(71) Applicants: COWAY CO., LTD., Gongju-si (KR); TORAY ADVANCED MATERIALS KOREA INC., Gumi-si (KR)

(72) Inventors: Sung-Kon Cho, Seoul (KR); Sung-Han Yun, Seoul (KR); Hae-Sun Lee, Seoul (KR); Sun-Yong Lee, Seoul (KR); Sang-Hyeon Kang, Seoul (KR); Doo-Won Han, Seoul (KR); In-Tak Lee, Seoul (KR); Gi-Lyang Kim, Seoul (KR); Dong-Gyu Kim, Seoul (KR); Kang-Jin Kim, Yangsan-si (KR); Jong-Kwan Kim, Gongju-si (KR); Jae-Hoon Moon, Daejeon (KR); Hee-Kyung Lee, Gumi-si (KR)

(73) Assignees: COWAY CO., LTD., Gongju-si (KR); TORAY ADVANCED MATERIALS KOREA INC., Gumi-si (KR)

( * ) Notice: Subject to any disclaimer, the term of this patent is extended or adjusted under 35 U.S.C. 154(b) by 126 days.

(21) Appl. No.: 16/754,969

(22) PCT Filed: Oct. 11, 2018

(86) PCT No.: PCT/KR2018/011929
§ 371 (c)(1),
(2) Date: Apr. 9, 2020

(87) PCT Pub. No.: WO2019/074281
PCT Pub. Date: Apr. 18, 2019

(65) Prior Publication Data
US 2020/0298181 A1    Sep. 24, 2020

(30) Foreign Application Priority Data
Oct. 12, 2017   (KR) .................. 10-2017-0132583

(51) Int. Cl.
*B01D 61/08* (2006.01)
*B01D 61/10* (2006.01)
(Continued)

(52) U.S. Cl.
CPC ............. *B01D 61/08* (2013.01); *B01D 61/10* (2013.01); *B01D 63/087* (2013.01); *C02F 1/441* (2013.01);
(Continued)

(58) Field of Classification Search
CPC ........ B01D 2201/302; B01D 2201/306; B01D 2201/46; B01D 2313/04; B01D 2313/08;
(Continued)

(56) References Cited

U.S. PATENT DOCUMENTS

| | | | | | |
|---|---|---|---|---|---|
| 4,744,900 | A | * | 5/1988 | Bratt | B01D 61/10 210/321.78 |
| 2017/0036168 | A1 | | 2/2017 | Lim et al. | |
| 2018/0353910 | A1 | * | 12/2018 | Lim | B01D 63/10 |

FOREIGN PATENT DOCUMENTS

| CN | 204803050 U | 11/2015 |
|---|---|---|
| CN | 106139904 A | 11/2016 |

(Continued)

OTHER PUBLICATIONS

International Search Report dated Mar. 27, 2019 in PCT/KR2018/011929 filed on Oct. 11, 2018, 2 pages.

*Primary Examiner* — Pranav N Patel
(74) *Attorney, Agent, or Firm* — Oblon, McClelland, Maier & Neustadt, L.L.P.

(57) ABSTRACT

A reverse osmosis filtering module includes: a purified water discharge pipe in which a purified water discharge path is formed, and which has a communication hole that is formed on an outer periphery thereof and communicates with the purified water discharge path; a reverse osmosis filtering
(Continued)

part including a reverse osmosis filtering member in which a purified water flow space is formed, and which is wound around the purified water discharge pipe such that the purified water flow space communicates with the communication hole; a first flow channel formation cap provided at one side and having an inlet hole; and a second flow channel formation cap provided at the other side of the reverse osmosis filtering part and having an outlet hole.

21 Claims, 9 Drawing Sheets

(51) Int. Cl.
  *B01D 63/10* (2006.01)
  *C02F 1/44* (2006.01)
  *B01D 63/08* (2006.01)
(52) U.S. Cl.
  CPC .. *B01D 2201/302* (2013.01); *B01D 2201/306* (2013.01); *B01D 2201/46* (2013.01); *B01D 2313/04* (2013.01); *B01D 2313/08* (2013.01); *B01D 2313/125* (2013.01); *B01D 2313/20* (2013.01); *B01D 2313/21* (2013.01); *B01D 2321/20* (2013.01)
(58) Field of Classification Search
  CPC .......... B01D 2313/125; B01D 2313/20; B01D 2313/21; B01D 2321/02; B01D 2321/10; B01D 2321/20; B01D 61/025; B01D 61/08; B01D 61/10; B01D 63/087; B01D 65/02; B01D 63/10; B01D 63/106; C02F 1/441; C02F 2201/002
  See application file for complete search history.

(56) References Cited

FOREIGN PATENT DOCUMENTS

| CN | 107126743 A | 9/2017 |
| JP | 2004-243296 A | 9/2004 |
| KR | 10-1482656 B1 | 1/2015 |
| KR | 10-2016-0053863 A | 5/2016 |
| WO | WO 2016/153245 A1 | 9/2016 |
| WO | WO 2017/115986 A1 | 7/2017 |

* cited by examiner

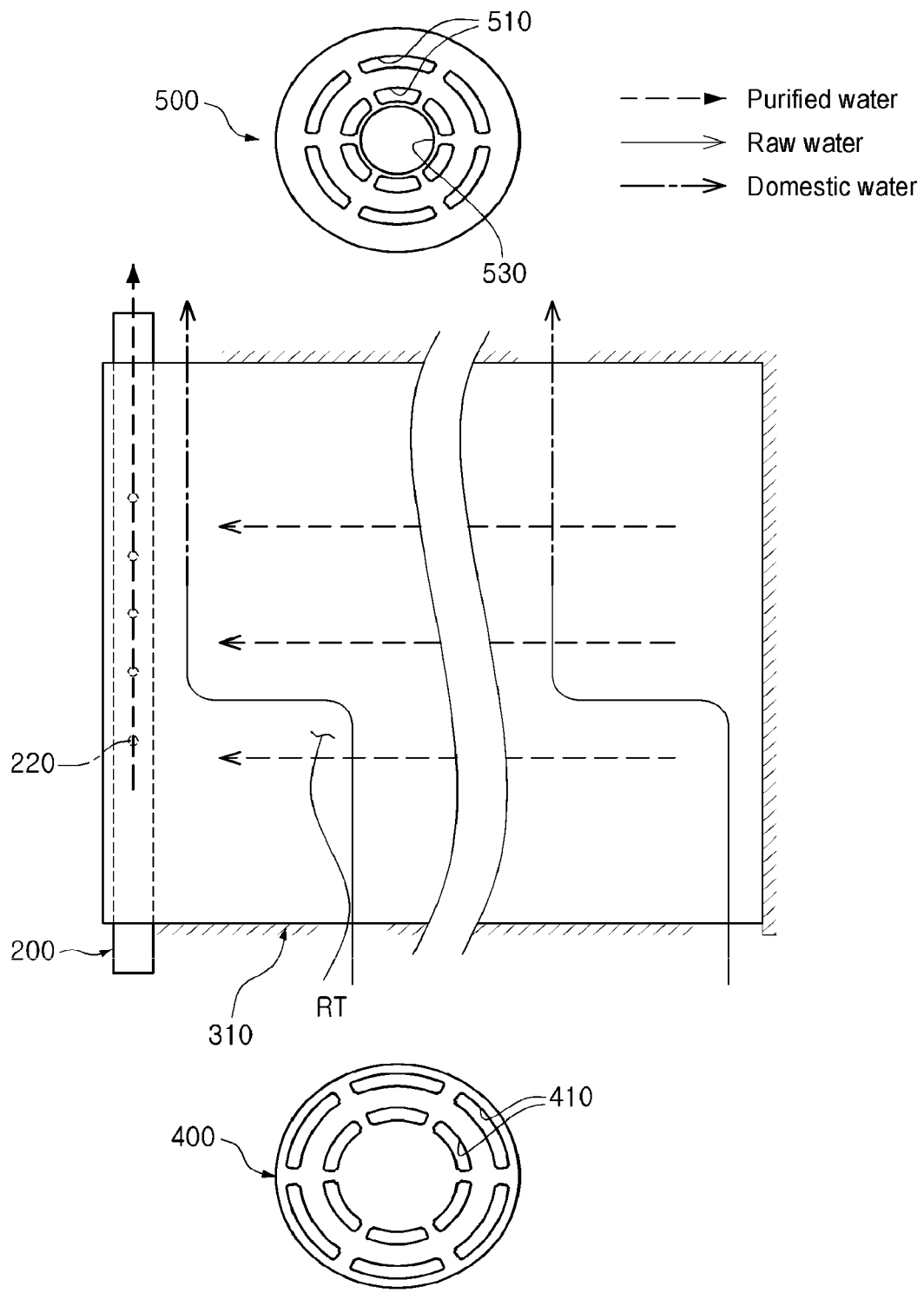

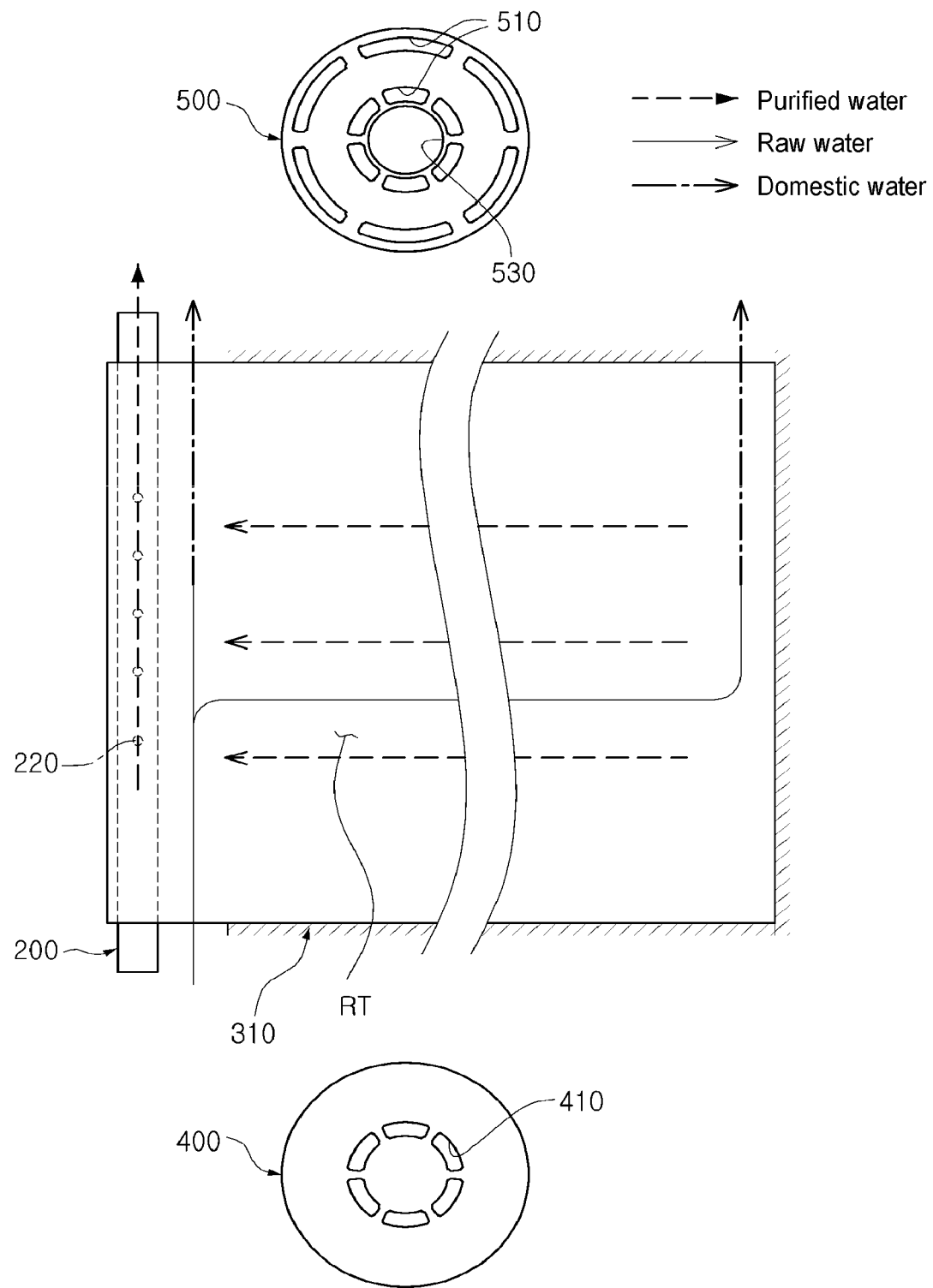

REVERSE OSMOSIS FILTERING MODULE AND REVERSE OSMOSIS FILTER COMPRISING SAME

TECHNICAL FIELD

The present disclosure relates to a reverse osmosis filtering module and a reverse osmosis filter comprising the same.

BACKGROUND

A reverse osmosis filter is a water purifying filter for filtering introduced raw water to produce purified water. A part of the raw water introduced into the reverse osmosis filter is filtered in the reverse osmosis filter and discharged from the reverse osmosis filter as purified water. The remaining raw water not filtered by the reverse osmosis filter is discharged from the reverse osmosis filter as domestic water.

The reverse osmosis filter includes a reverse osmosis filtering module and a housing configured to accommodate the reverse osmosis filtering module therein.

The housing has an introduction port through which raw water is introduced, a purified water discharge port through which purified water is discharged, and a domestic water discharge port, through which domestic water is discharged. The reverse osmosis filtering module includes a purified water discharge pipe and a reverse osmosis filtering member. In the purified water discharge pipe, there is formed a purified water discharge path which is opened at one end and closed at the other end. A communication hole communicating with the purified water discharge path is formed on an outer periphery of the purified water discharge pipe. A purified water flow space is formed in the reverse osmosis filtering member. The reverse osmosis filtering member is wound around the purified water discharge pipe multiple times to communicate with the communication hole of the purified water discharge pipe. The reverse osmosis filtering member is wound around the purified water discharge pipe multiple times to form a flow channel therebetween, through which water flows.

In this configuration, the reverse osmosis filtering member is wound around the purified water discharge pipe multiple times to form a flow channel therebetween; and when the raw water is introduced through the inlet of the housing, the raw water flows through the flow channel. A part of the raw water flows toward the water purifying space through the reverse osmosis filtering member. The raw water is converted into purified water in the water purifying space. The purified water flows through the purified water flow space. The purified water flowing through the purified water flow space enters the purified water discharge path of the purified water discharge pipe through the communication hole of the purified water discharge pipe and flows through the purified water discharge path. Thereafter, the purified water is discharged to the outside through the purified water discharge port of the housing.

In addition, the domestic water, which is the remaining raw water that has failed to pass through the reverse osmosis filtering member and failed to be filtered while flowing through the flow channel (the reverse osmosis filtering member is wound around the purified water discharge pipe multiple times to form the flow channel therebetween), is discharged to the outside through the domestic water discharge port of the housing.

Conventionally, in a reverse osmosis filter having such a configuration as described, the reverse osmosis filtering member of the reverse osmosis filter is flushed by separately supplying flushing water to the reverse osmosis filter, for example, to the domestic water discharge port of the housing of the reverse osmosis filter.

SUMMARY

The present disclosure is made upon recognizing at least one of the above-mentioned demands or problems of the related art.

One aspect of the present disclosure is to provide a technique capable of prolonging a lifespan of a reverse osmosis filter.

Another aspect of the present disclosure is to provide a technique capable of flushing a reverse osmosis filtering member of a reverse osmosis filter without having to separately supply flushing water.

Another aspect of the present disclosure is to provide a technique capable of providing first and second flow channel formation caps at one and the other sides of a reverse osmosis filtering part including a reverse osmosis filtering member that is wound around a purified water discharge pipe multiple times to form a predetermined water flow channel therebetween.

The reverse osmosis filtering module and the reverse osmosis filter including the same according to an embodiment for implementing at least one of the foregoing aspects may include the following features.

A reverse osmosis filtering module according to one embodiment of the present disclosure may include: a purified water discharge pipe in which a purified water discharge path is formed, and which has a communication hole that is formed on an outer periphery thereof and communicates with the purified water discharge path, one end of the purified water discharge path being opened and the other end of the purified water discharge path being closed; a reverse osmosis filtering part including a reverse osmosis filtering member in which a purified water flow space is formed, and which is wound around the purified water discharge pipe multiple times such that the purified water flow space communicates with the communication hole; and first and second flow channel formation caps provided at one side and the other side of the reverse osmosis filtering part, respectively, such that the reverse osmosis filtering member is wound around the purified water discharge pipe to form a flow channel therebetween, through which water flows.

In this case, the first and second flow channel formation caps may be configured such that a part of raw water introduced into the flow channel flows into the purified water flow space through the reverse osmosis filtering member, becomes purified water, and then flows through the purified water flow space, and such that domestic water (which is remaining raw water that has failed to pass through the reverse osmosis filtering member and failed to be filtered) flushes the reverse osmosis filtering member while flowing through the flow channel.

The first flow channel formation cap may have an inlet hole connected to the flow channel such that the raw water is introduced, and the second flow channel formation cap has an outlet hole connected to the flow channel such that the domestic water is discharged from the flow channel.

The inlet hole and the outlet hole may be formed along a circumferential direction on the first flow channel formation cap and the second flow channel formation cap, respectively.

The inlet hole and the outlet hole may be formed on the first flow channel formation cap and the second flow channel formation cap, respectively, such that the inlet hole and the outlet hole are not aligned with each other and do not face each other.

The first flow channel formation cap may include a first insertion portion into which the one side of the reverse osmosis filtering part may be inserted and which communicates with the inlet hole, and the second flow channel formation cap may include a second insertion portion into which the other side of the reverse osmosis filtering part is inserted and which communicates with the outlet hole.

A first sealing space to be filled with a sealing material that seals a corresponding portion of the one side of the reverse osmosis filtering part may be formed in a portion of the first insertion portion that does not communicate with the inlet hole, and a second sealing space to be filled with a sealing material that seals a corresponding portion of the other side of the reverse osmosis filtering part may be formed in a portion of the second insertion portion that does not communicate with the outlet hole.

A first partition wall defining at least a portion of the first sealing space may be formed in the first insertion portion, and a second partition wall defining at least a portion of the second sealing space may be formed in the second insertion portion.

A stepped portion may be formed in at least one of the one side and the other side of the reverse osmosis filtering part such that at least parts of the one side and the other side of the reverse osmosis filtering part are inserted into the first sealing space and the second sealing space, respectively, to prevent the sealing material from leaking through the inlet hole or the outlet hole.

A through-hole through which the purified water discharge pipe passes may be formed on at least one of the first flow channel formation cap and the second flow channel formation cap.

A reverse osmosis filter according to one embodiment of the present disclosure may include: the reverse osmosis filtering module set forth above; and a housing configured to accommodate the reverse osmosis filtering module therein, the housing having an introduction port communicating with the inlet hole of the first flow channel formation cap, a purified water discharge port communicating with the opened one side of the purified water discharge path of the purified water discharge pipe, and a domestic water discharge port communicating with the outlet hole of the second flow channel formation cap.

In this case, the reverse osmosis filtering module may be provided with a sealing member that seals a gap between the reverse osmosis filtering module and the housing to prevent raw water introduced into the introduction port from being discharged to the purified water discharge port or the domestic water discharge port through the gap between the reverse osmosis filtering module and the housing.

As described above, according to the embodiment of the present disclosure, it is possible to provide first and second flow channel formation caps at one side and the other side of the reverse osmosis filtering part, respectively, including a reverse osmosis filtering member that is wound around a purified water discharge pipe multiple times to form a predetermined flow channel therebetween, through which water flows.

Furthermore, according to the embodiment of the present disclosure, it is possible to flush a reverse osmosis filtering member of a reverse osmosis filter without having to separately supply flushing water.

In addition, according to the embodiment of the present disclosure, it is possible to prolong a lifespan of a reverse osmosis filter.

BRIEF DESCRIPTION OF THE DRAWINGS

FIG. 8 is an exploded perspective view of the reverse osmosis filter according to one embodiment of the present disclosure.

FIG. 9 is a sectional view taken along the line II-II' in FIG. 7.

DETAILED DESCRIPTION

Figure 1:
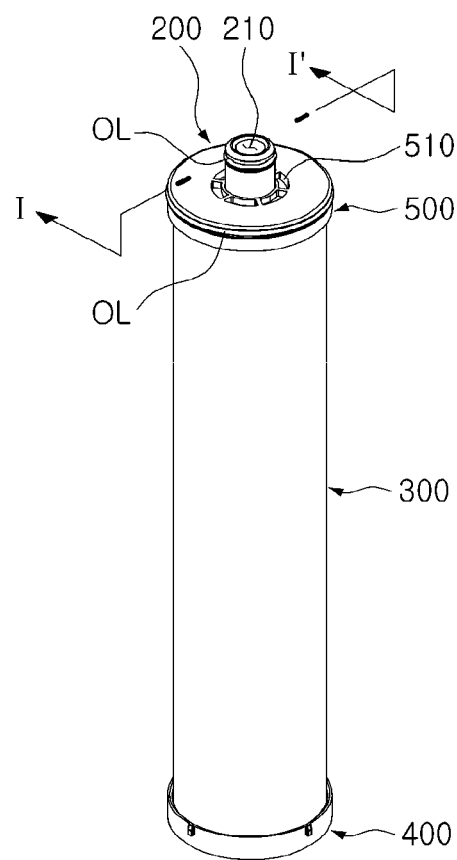
FIG. 1 is a perspective view showing a reverse osmosis filtering module according to one embodiment of the present disclosure.

In order to help the understanding of features of the present disclosure as described above, a reverse osmosis filtering module and a reverse osmosis filter comprising the same according to embodiments of the present disclosure will now be described in more detail.

The present disclosure will be described based on the embodiments most suitable for the understanding the technical features of the present disclosure. The technical features of the present disclosure are not limited by the embodiments described below. The present disclosure may be implemented as in the embodiments described below. Accordingly, the present disclosure may be modified in various ways within the technical scope of the present disclosure through the embodiments described below. Such modifications fall within the technical scope of the present disclosure. In addition, in the drawings attached to help the understanding of the embodiments described below, the components having the same function are designated by like reference numerals throughout the embodiments.

Reverse Osmosis Filtering Module

Hereinafter, the reverse osmosis filtering module according to the present disclosure will be described with reference to FIGS. 1 to 6.

Figure 2:
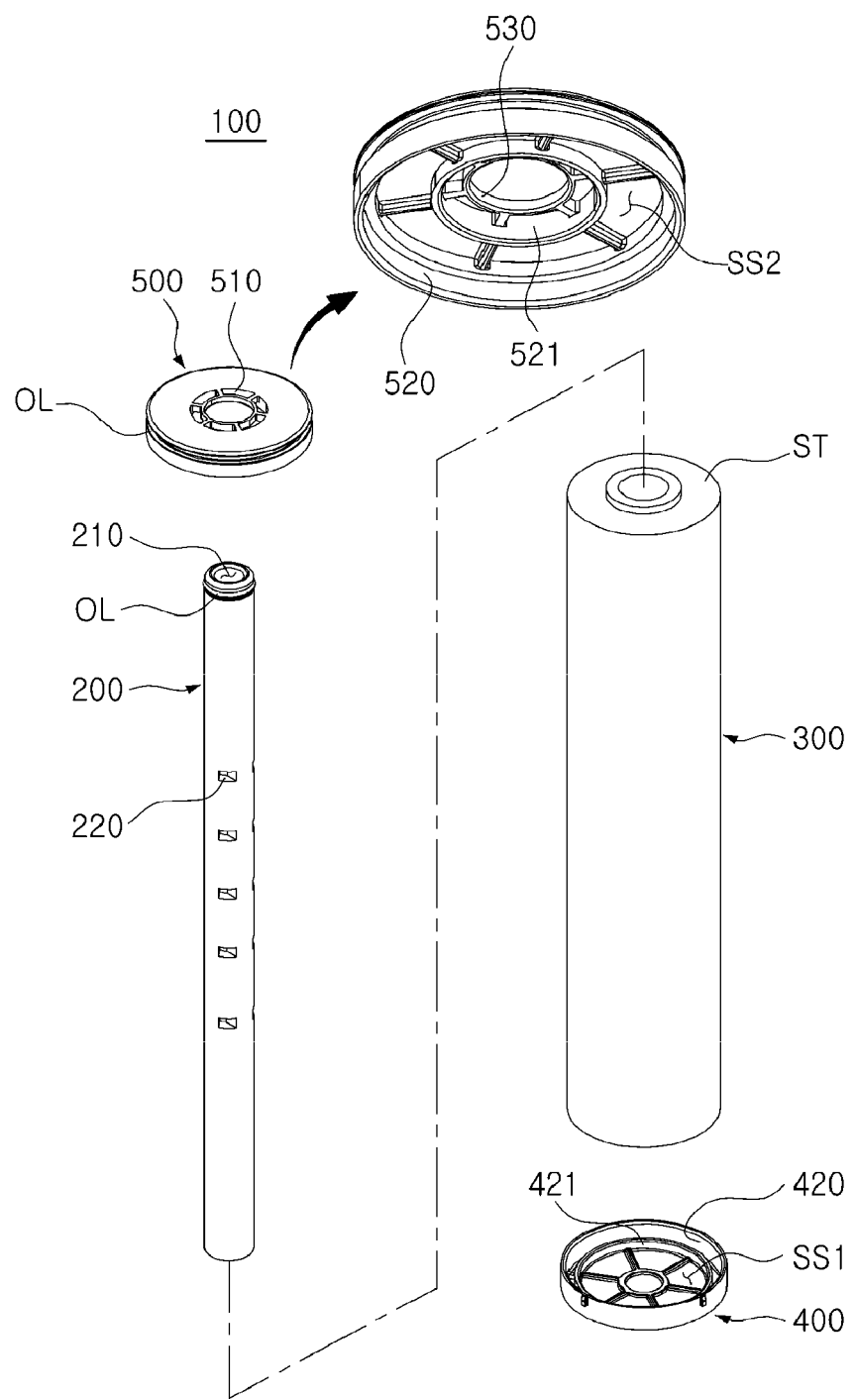
FIG. 2 is an exploded perspective view of the reverse osmosis filtering module according to one embodiment of the present disclosure.
Figure 3:
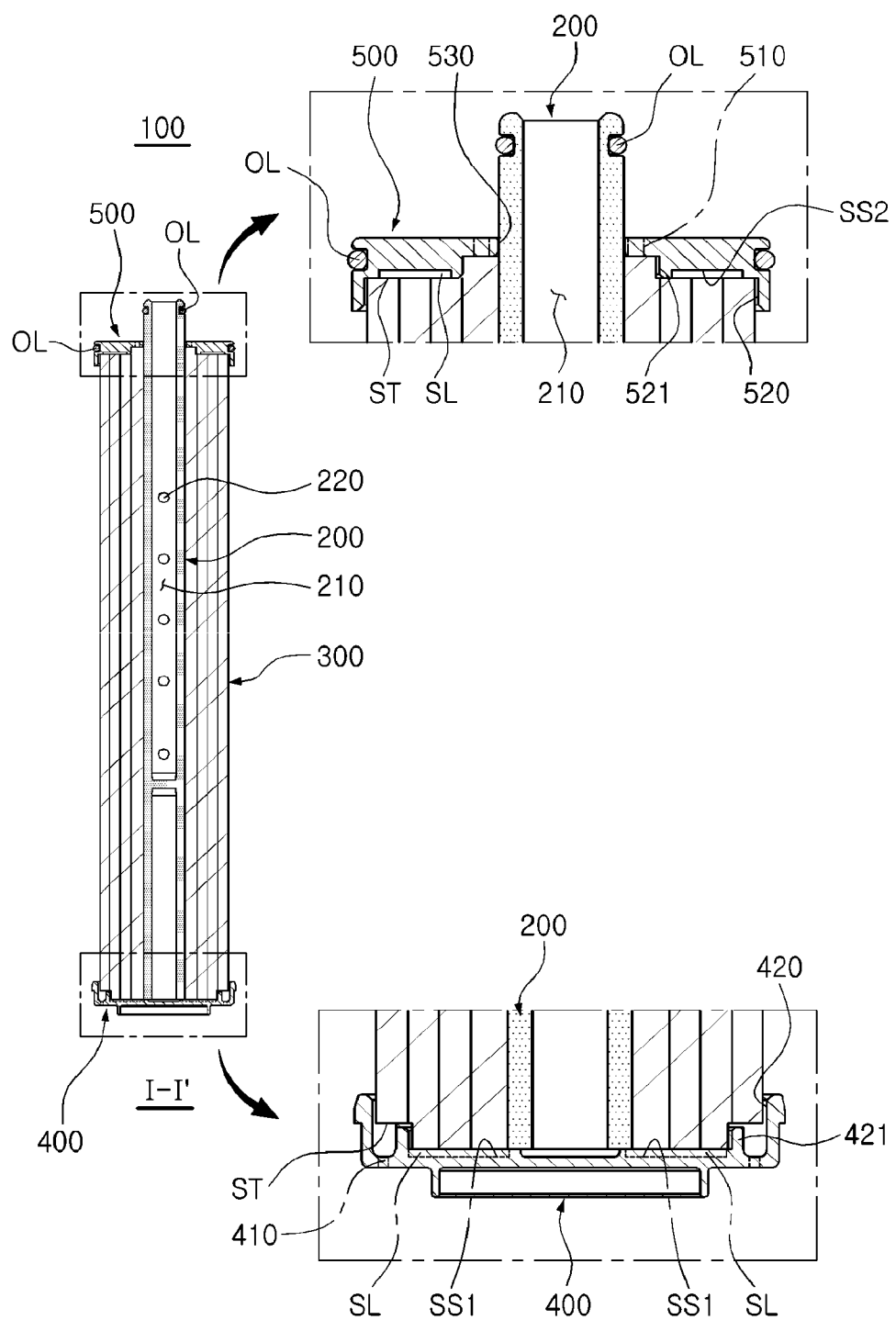
FIG. 3 is a sectional view taken along line I-I' in FIG. 1.

FIG. 1 is a perspective view showing a reverse osmosis filtering module according to one embodiment of the present disclosure. FIG. 2 is an exploded perspective view of the reverse osmosis filtering module according to one embodiment of the present disclosure. FIG. 3 is a sectional view taken along line I-I' in FIG. 1.

Figure 4:
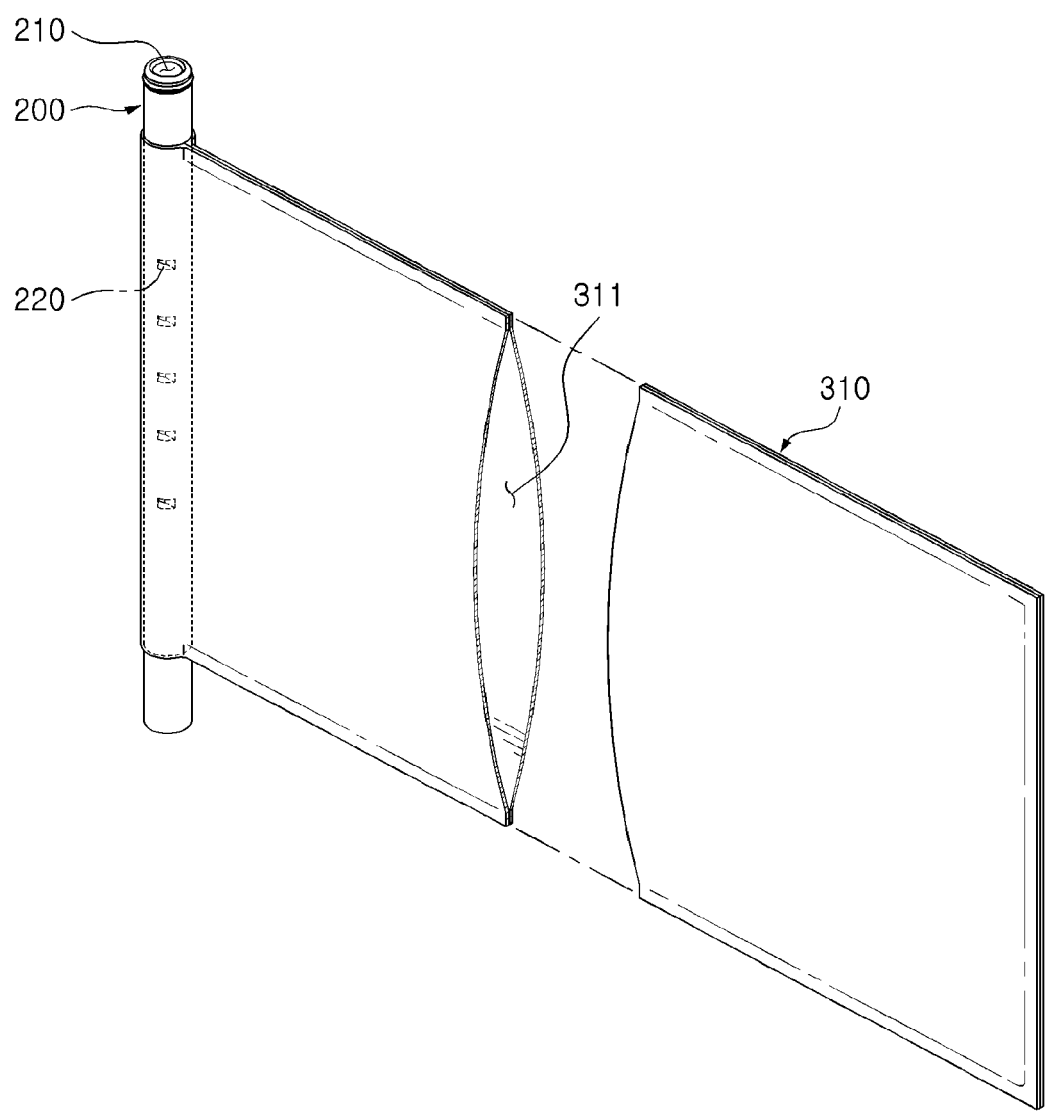
FIG. 4 is a perspective view showing a reverse osmosis filtering member unwound from a purified water discharge pipe of the reverse osmosis filtering module according to the present disclosure.

FIG. 4 is a perspective view showing a reverse osmosis filtering member unwound from a purified water discharge pipe of the reverse osmosis filtering module according to the present disclosure.

Figure 5:
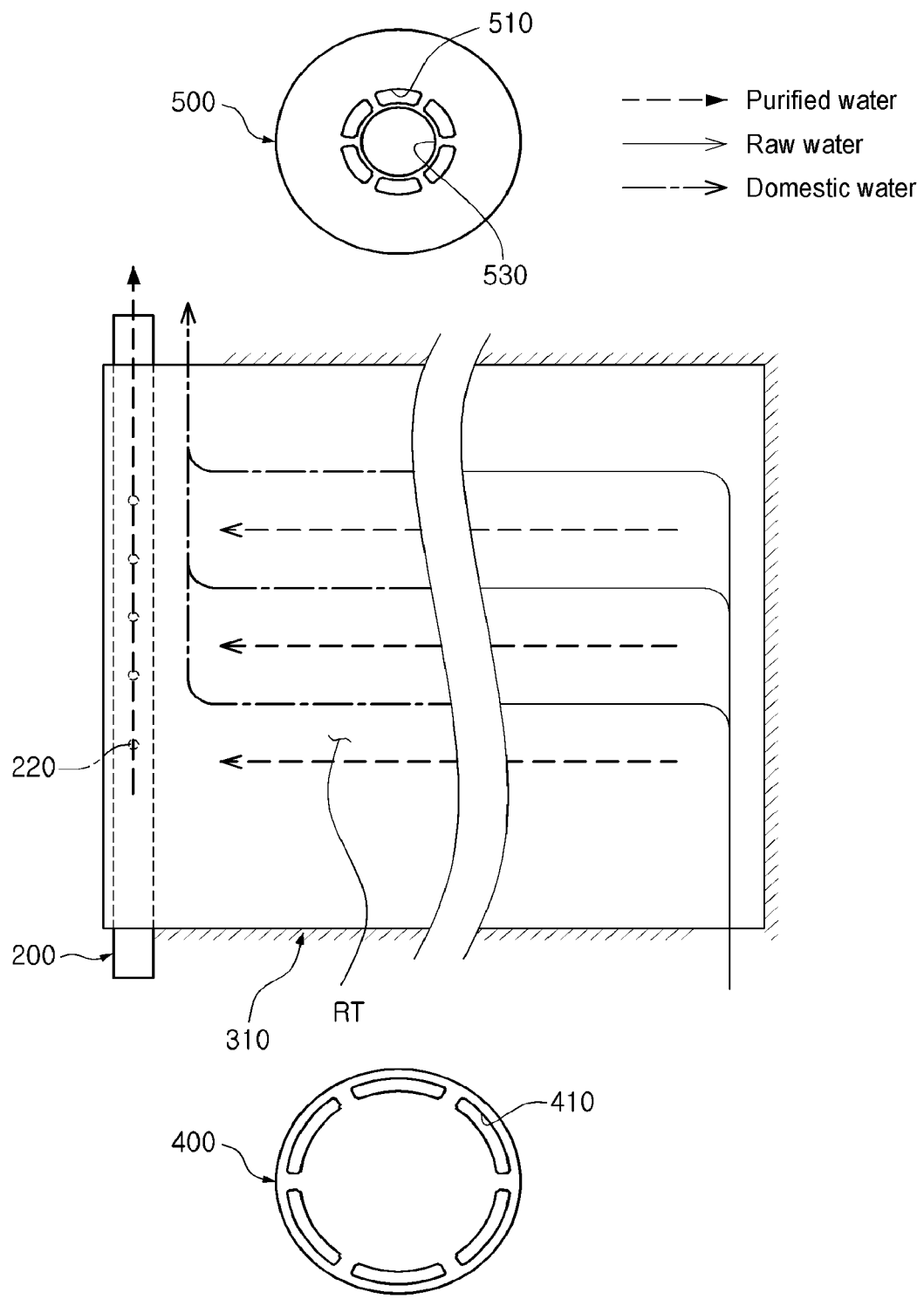
FIG. 5 is a plan view of a first flow channel formation cap and a second flow channel formation cap of the reverse osmosis filtering module according to one embodiment of the present disclosure, and is a conceptual diagram which shows that water undergoes filtering or flushes the reverse osmosis filtering member while flowing through a predetermined flow channel formed between the reverse osmosis filtering member of the reverse osmosis filtering part by the first flow channel formation cap and the second flow channel formation cap.

FIG. 5 is a plan view of a first flow channel formation cap and a second flow channel formation cap of the reverse osmosis filtering module according to one embodiment of the present disclosure, and is a conceptual diagram which shows that water undergoes filtering or flushes the reverse osmosis filtering member while flowing through a predetermined flow channel formed between the reverse osmosis filtering member of the reverse osmosis filtering part by the first flow channel formation cap and the second flow channel formation cap.

Figure 6:
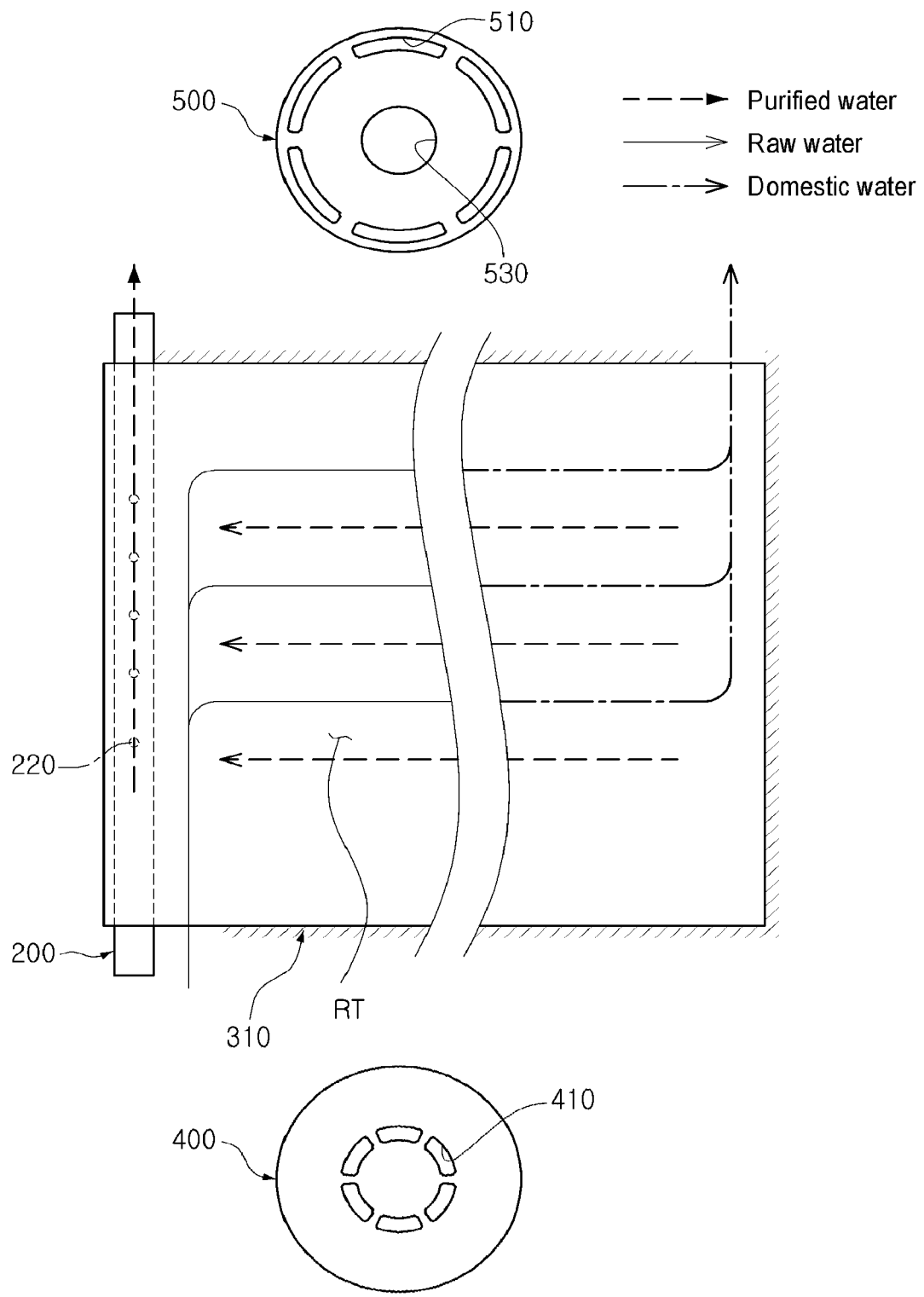
FIG. 6 is a plan view of a first flow channel formation cap and a second flow channel formation cap of a reverse osmosis filtering module according to another embodiment of the present disclosure, and is a conceptual diagram which shows that water undergoes filtering or flushes the reverse osmosis filtering member while flowing through a predetermined flow channel formed between the reverse osmosis filtering member of the reverse osmosis filtering part by the first flow channel formation cap and the second flow channel formation cap.

FIG. 6 is a plan view of a first flow channel formation cap and a second flow channel formation cap of a reverse osmosis filtering module according to another embodiment of the present disclosure, and is a conceptual diagram which shows that water undergoes filtering or flushes the reverse osmosis filtering member while flowing through a predetermined flow channel formed between the reverse osmosis filtering member of the reverse osmosis filtering part by the first flow channel formation cap and the second flow channel formation cap.

The reverse osmosis filtering module 100 according to the present disclosure may include a purified water discharge pipe 200, a reverse osmosis filtering part 300, and first and second flow channel formation caps 400 and 500.

The purified water discharge pipe 200 may have a purified water discharge path 210 formed therein. As shown in FIG. 3, one end of the purified water discharge path 210 may be opened and the other end thereof may be closed.

A communication hole 220 communicating with the purified water discharge path 210 may be formed on an outer periphery of the purified water discharge pipe 200. As shown in FIG. 2, a plurality of such communication holes 220 may be formed in a plurality of rows along the length of the purified water discharge pipe 200 on the outer periphery of the purified water discharge pipe 200. However, the arrangement and the number of the communication holes 220 formed on the outer periphery of the purified water discharge pipe 200 are not particularly limited, and may be any arrangement and number as long as the communication holes 220 can communicate with the purified water discharge path 210.

As shown in FIG. 4, the reverse osmosis filtering part 300 may be formed by winding a reverse osmosis filtering member 310 having a purified water flow space 311 around the purified water discharge pipe 200 multiple times such that the purified water flow space 311 can communicate with the communication holes 220 of the purified water discharge pipe 200.

As a result, as shown in FIG. 2, the reverse osmosis filtering part 300 may have a cylindrical shape.

A stepped portion ST may be formed on at least one of the one side and the other side of the reverse osmosis filtering part 300.

The one side and the other side of the reverse osmosis filtering part 300 may be inserted into first and second insertion portions 420 and 520 formed on first and second flow channel formation caps 400 and 500, respectively. In addition, an inlet hole 410 and an outlet hole 510 are formed in the first and second flow channel formation caps 400 and 500, respectively. The first and second insertion portions 420 and 520 may communicate with the inlet hole 410 and the outlet hole 510, respectively. As will be described later, sealing spaces SS1 and SS2 filled with a sealing material SL may be respectively formed in the portions of first and second insertion portions 420 and 520 which do not communicate with the inlet hole 410 or the outlet hole 510.

If the stepped portion ST is formed on at least one of the one side and the other side of the reverse osmosis filtering part 300 as described above, when the one side and the other side of the reverse osmosis filtering part 300 are inserted into the first and second insertion portions 420 and 520, respectively, at least parts of the one side and the other side of the reverse osmosis filtering part 300 may be inserted into the first and second sealing spaces SS1 and SS2, respectively.

Accordingly, the sealing material SL filled in the first and second sealing spaces SS1 and SS2 may be prevented from leaking through the inlet hole 410 or the outlet hole 510 of the first and second flow channel formation caps 400 and 500. This may make it easy to manufacture the reverse osmosis filtering module 100.

The first and second flow channel formation caps 400 and 500 are provided at the one side and the other side of the reverse osmosis filtering part 300, respectively, such that the reverse osmosis filtering member 310 of the reverse osmosis filtering part 300 is wound around the purified water discharge pipe 200 multiple times to form a predetermined flow channel RT therebetween, through which water flows as shown in FIGS. 5 and 6.

As described above, the reverse osmosis filtering module 100 according to the present disclosure may use the first and second flow channel formation caps 400 and 500 to form the predetermined flow channel RT, through which water flows, between the reverse osmosis filtering member 310 of the reverse osmosis filtering part 300 wound around the purified water discharge pipe 200 multiple times.

Therefore, the reverse osmosis filtering module 100 according to the present disclosure may be manufactured by adding the first and second flow channel formation caps 400 and 500 to the conventional reverse osmosis filtering module 100 including only the purified water discharge pipe 200 and the reverse osmosis filtering part 300 without separately manufacturing the reverse osmosis filtering module 100 according to the present disclosure.

Thus, it is possible to easily manufacture the reverse osmosis filtering module 100 according to the present disclosure.

As shown in FIGS. 5 and 6, the first and second flow channel formation caps 400 and 500 may be configured such that a part of the raw water introduced into the predetermined flow channel RI, which the reverse osmosis filtering member 310 is wound around the purified water discharge pipe 200 multiple times to form therebetween, passes through the reverse osmosis filtering member 310 and flows into the purified water flow space 311.

The purified water flowing through the purified water flow space 311 of the reverse osmosis filtering member 310 may be introduced into the purified water discharge path 210 of the purified water discharge pipe 200 through the communication holes 220 of the purified water discharge pipe 200 and may be discharged to the outside through the purified water discharge path 210 as shown in FIGS. 5 and 6.

In addition, the first and second flow channel formation caps 400 and 500 may be configured such that, as shown in FIGS. 5 and 6, the domestic water, which is the remaining raw water that has failed to pass through the reverse osmosis filtering member 310 and failed to be filtered while flowing through the predetermined flow channel RT (the reverse osmosis filtering member 310 is wound around the purified water discharge pipe 200 multiple times to form the predetermined flow channel RT therebetween), can flush the reverse osmosis filtering member 310 while flowing through the flow channel RT.

Accordingly, the reverse osmosis filtering member 310 may be flushed without having to separately supply flushing water. This makes it possible to prolong the lifespan of the reverse osmosis filtering module 100 and the lifespan of the below-described reverse osmosis filter 10 including the reverse osmosis filtering module 100.

The domestic water that has flushed the reverse osmosis filtering member 310 may be discharged to the outside through the outlet hole 510 of the second flow channel formation cap 500.

The inlet hole 410 may be formed in the first flow channel formation cap 400 as shown in FIGS. 3, 5, and 6. The inlet hole 410 may be connected to the predetermined flow channel RT, which the reverse osmosis filtering member 310 is wound around the purified water discharge pipe 200 multiple times to form therebetween. The raw water may be introduced through the inlet hole 410 into the predetermined flow channel RT which the reverse osmosis filtering member 310 is wound around the purified water discharge pipe 200 multiple times to form therebetween.

The outlet hole 510 may be formed in the second flow channel formation cap 500 as shown in FIGS. 1 to 3, 5, and 6. The outlet hole 510 may be connected to the predetermined flow channel RI, which the reverse osmosis filtering member 310 is wound around the purified water discharge pipe 200 multiple times to form therebetween. Then, the domestic water may be discharged to the outside through the outlet hole 510 from the predetermined flow channel RI, which the reverse osmosis filtering member 310 is wound around the purified water discharge pipe 200 multiple times to form therebetween.

The inlet hole 410 and the outlet hole 510 may be formed along the circumferential direction in the first flow channel formation cap 400 and the second flow channel formation cap 500, respectively. For example, as illustrated in FIGS. 5 and 6, such inlet holes 410 and outlet holes 510 may be formed in a plurality of rows along the circumferential direction of the first flow channel formation cap 400 and the second flow channel formation cap 500, respectively.

The inlet hole 410 and the outlet hole 510 may be formed on the first flow channel formation cap 400 and the second flow channel formation cap 500, respectively, such that they are not aligned with each other and do not face each other as shown in FIGS. 3, 5, and 6.

Thus, as shown in FIGS. 5 and 6, the reverse osmosis filtering member 310 is wound around the purified water discharge pipe 200 multiple times to form a relatively long predetermined flow channel RT therebetween, which is connected at one side and the other side to the inlet hole 410 and the outlet hole 510, respectively.

Accordingly, the domestic water that has failed to pass through the reverse osmosis filtering member 310 and failed to be filtered while flowing through the predetermined flow channel RT (the reverse osmosis filtering member 310 is wound around the purified water discharge pipe 200 multiple times to form the predetermined flow channel RT therebetween), may sufficiently flush the reverse osmosis filtering member 310 while flowing through the relatively long flow channel RT.

As shown in FIG. 2, a first insertion portion 420 may be formed in the first flow channel formation cap 400. As shown in FIG. 3, one side of the reverse osmosis filtering part 300 may be inserted into the first insertion portion 420. In addition, the first insertion portion 420 may communicate with the inlet hole 410.

A first sealing space SS1 may be formed in a portion of the first insertion portion 420 that does not communicate with the inlet hole 410. For example, as shown in FIG. 2, a first partition wall 421 defining at least a portion of the first sealing space SS1 may be formed in the first insertion portion 420 to form the first sealing space SS1 in the first insertion portion 420.

A sealing material SL may be filled in the first sealing space SS1. Thus, when the one side of the reverse osmosis filtering part 300 is inserted into the first insertion portion 420, a portion of the one side of the reverse osmosis filtering part 300 corresponding to the first sealing space SS1 may be sealed. As a result, a predetermined flow channel RI through which water flows may be formed between the reverse osmosis filtering member 310 wound around the purified water discharge pipe 200 multiple times.

As shown in FIG. 2, a second insertion portion 520 may be formed in the second flow channel formation cap 500. As shown in FIG. 3, the other side of the reverse osmosis filtering part 300 may be inserted into the second insertion portion 520. In addition, the second insertion portion 520 may communicate with the outlet hole 510.

A second sealing space SS2 may be formed in the portion of the second insertion portion 520 that does not communicate with the outlet hole 510. For example, as shown in FIG. 2, a second partition wall 521 defining at least a portion of the second sealing space SS2 may be formed in the second insertion portion 520 to form the second sealing space SS2 in the second insertion portion 520.

A sealing material SL may be filled in the second sealing space SS2. Thus, when the other side of the reverse osmosis filtering part 300 is inserted into the second insertion portion 520, a portion of the other side of the reverse osmosis filtering part 300 corresponding to the second sealing space SS2 may be sealed. As a result, a predetermined flow channel RT through which water flows may be formed between the reverse osmosis filtering member 310 wound around the purified water discharge pipe 200 multiple times.

Meanwhile, at least one of the first flow channel formation cap 400 and the second flow channel formation cap 500 may have a through-hole 530 through which the purified water discharge pipe 200 passes. For example, as shown in FIGS. 2 and 3, the through-hole 530 may be formed in the second flow channel formation cap 500. Alternatively, the through-hole 530 may be formed in the first flow channel formation cap 400, or may be formed in both the first flow channel formation cap 400 and the second flow channel formation cap 500.

Reverse Osmosis Filter

Hereinafter, the reverse osmosis filter according to the present disclosure will be described with reference to FIGS. 7 to 9.

Figure 7:
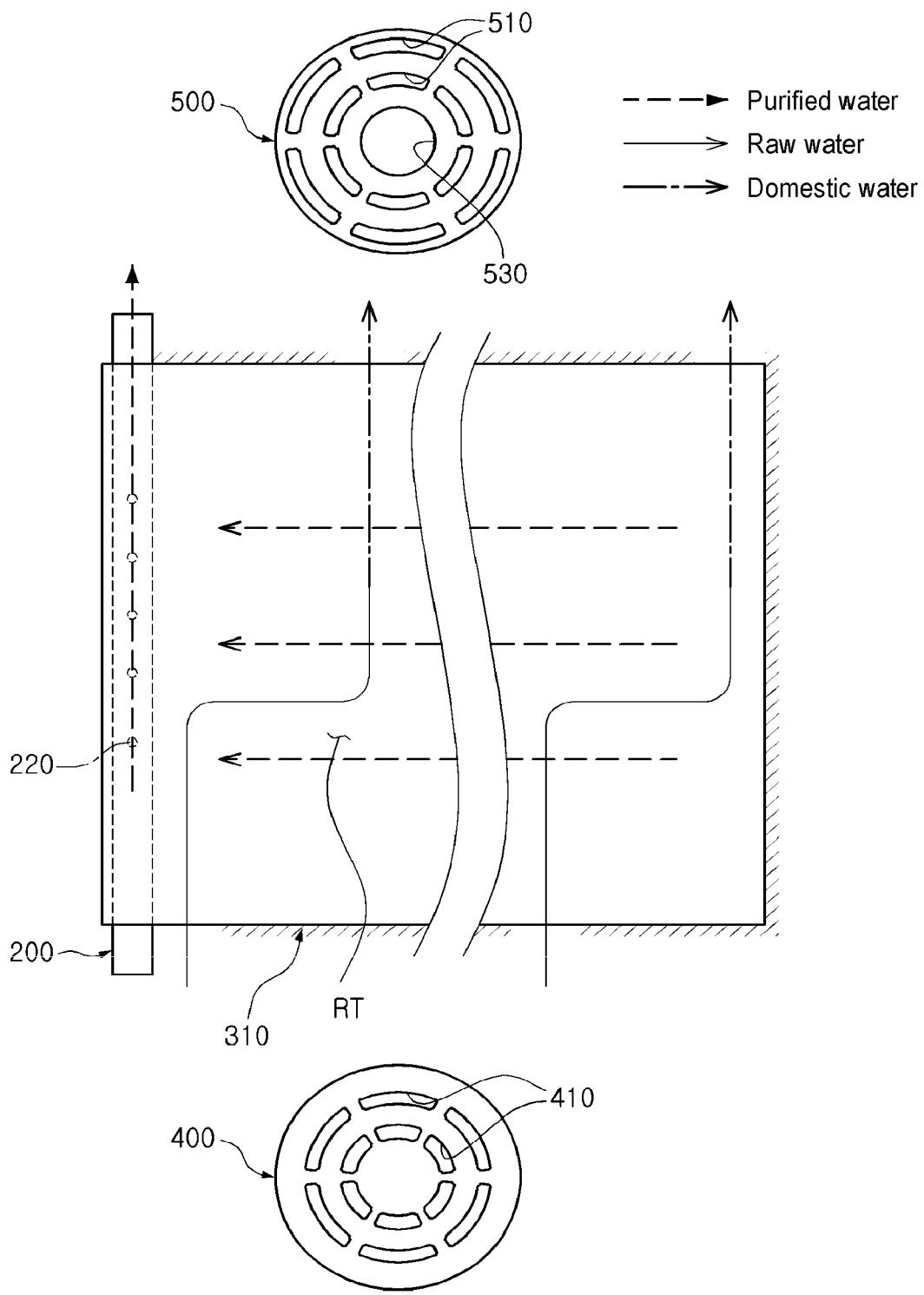
FIG. 7 is a perspective view showing a reverse osmosis filter according to one embodiment of the present disclosure.

FIG. 7 is a perspective view showing the reverse osmosis filter according to one embodiment of the present disclosure. FIG. 8 is an exploded perspective view of the reverse osmosis filter according to one embodiment of the present disclosure. FIG. 9 is a sectional view taken along the line II-II' in FIG. 7.

The reverse osmosis filter 10 according to the present disclosure may include a reverse osmosis filtering module 100 and a housing 20.

Since the reverse osmosis filtering module 100 has been described above, a description thereof will be omitted below.

The reverse osmosis filtering module 100 may be provided inside the housing 20.

For example, as shown in FIGS. 7 to 9, the housing 20 may include a first housing member 21 and a second housing member 22. The first housing member 21 and the second housing member 22 are connected to each other in a state in which the reverse osmosis filtering module 100 is inserted into any one of the first housing member 21 and the second housing member 22, whereby the reverse osmosis filtering module 100 may be provided inside the housing 20.

However, the configuration of the housing 20 having the reverse osmosis filtering module 100 provided therein is not particularly limited. The housing 20 may have any well-known configuration as long as it can accommodate the reverse osmosis filtering module 100 therein.

The housing 20 may include an introduction port 21a communicating with the inlet hole 410 of the first flow channel formation cap 400 of the reverse osmosis filtering module 100, a purified water discharge port 22a communicating with the opened one side of the purified water discharge path 210 of the purified water discharge pipe 200 of the reverse osmosis filtering module 100, and a domestic water discharge port 22b communicating with the outlet hole 510 of the second flow channel formation cap 500.

For example, as illustrated in FIGS. 7 to 9, the introduction port 21a may be provided in the first housing member 21, and the purified water discharge port 22a and the domestic water discharge port 22b may be provided in the second housing member 22.

Raw water introduced into the introduction port 21a of the housing 20 may pass through the inlet hole 410 of the first flow channel formation cap 400 of the reverse osmosis filtering module 100, and may flow into the predetermined flow channel RT, which the reverse osmosis filtering member 310 is wound around the purified water discharge pipe 200 of the reverse osmosis filtering module 100 multiple times to form therebetween.

A part of the raw water introduced into the predetermined flow channel RI', which the reverse osmosis filtering member 310 is wound around the purified water discharge pipe 200 of the reverse osmosis filtering module 100 multiple times to form therebetween, may flow into the purified water flow space 311 of the reverse osmosis filtering member 310 through the reverse osmosis filtering module 310. The raw water may be converted into purified water while flowing through the purified water flow space 311.

The purified water flowing through the purified water flow space 311 of the reverse osmosis filtering member 310 may be introduced into the purified water discharge path 210 of the purified water discharge pipe 200 through the communication hole 220 of the purified water discharge pipe 200. After flowing through the purified water discharge path 210, the purified water may be discharged to the outside through the purified water discharge port 22a of the housing 20.

On the other hand, the domestic water as the remaining raw water that failed to pass through the reverse osmosis filtering member 310 and failed to be filtered while flowing through the predetermined flow channel RT (the reverse osmosis filtering member 310 is wound around the purified water discharge pipe 200 multiple times to form the predetermined flow channel RT therebetween) may flush the reverse osmosis filtering member 310 while flowing through the flow channel RT.

The domestic water that has flushed the reverse osmosis filtering member 310 may be discharged to the outside through the outlet hole 510 of the second flow channel formation cap 500 of the reverse osmosis filtering member 310 and the domestic water discharge port 22b of the housing 20.

The reverse osmosis filtering module 100 may be provided with a sealing member OL sealing a gap between the reverse osmosis filtering module 100 and the housing 20. This makes it possible to prevent the raw water introduced into the introduction port 21a of the housing 20 from being discharged to the purified water discharge port 22a or the domestic water discharge port 22b of the housing 20 through the gap between the reverse osmosis filtering module 100 and the housing 20.

As described above, the gap between the reverse osmosis filtering module 100 and the housing 20 may be sealed with only the sealing member OL. Therefore, it is possible to minimize an empty space between the reverse osmosis filtering module 100 and the housing 20. In a conventional reverse osmosis filter 10 that requires a configuration other than the sealing member OL to seal a gap between the reverse osmosis filtering module 100 and the housing 20, a relatively large empty space is present between the reverse osmosis filtering module 100 and the housing 20. However, in the reverse osmosis filter 10 of the present disclosure, as described above, it is possible to minimize the empty space between the reverse osmosis filtering module 100 and the housing 20, whereby the larger reverse osmosis filtering module 100 may be provided inside the housing 20.

As described above, by using the reverse osmosis filtering module and the reverse osmosis filter including same according to the present disclosure, it is possible to provide the first and second flow channel formation caps at the one side and the other side of the reverse osmosis filtering part including the reverse osmosis filtering member wound around the purified water discharge pipe multiple times, thereby forming the predetermined water flow channel between the reverse osmosis filtering member. It is also possible to flush the reverse osmosis filtering member of the reverse osmosis filter without having to separately supply flushing water. This makes it possible to prolong the lifespan of the reverse osmosis filter.

The reverse osmosis filtering module and the reverse osmosis filter including same as described above are not limited to the configurations of the above-described embodiments. All or some of the above-described embodiments may be selectively combined so as to provide various modifications.

What is claimed is:

1. A reverse osmosis filtering module, comprising:
a purified water discharge pipe having a container shape in which a purified water discharge path is formed, and which has a communication hole that is formed on an outer periphery of the purified water discharge pipe and communicates with the purified water discharge path, one end of the purified water discharge path being opened and the other end of the purified water discharge path being closed;
a reverse osmosis filtering part including a reverse osmosis filtering member in which a purified water flow space is formed, which is coupled to the purified water discharge pipe such that the purified water flow space communicates with the communication hole, and which is wound around the purified water discharge pipe multiple times to be formed of a cylindrical shape, the reverse osmosis filtering member having outer surfaces which face each other and between which a flow channel through which water flows is formed;

a first flow channel formation cap coupled to one side of the reverse osmosis filtering part, and having an inlet hole connected to the flow channel such that raw water is introduced into the flow channel; and a second flow channel formation cap coupled to the other side of the reverse osmosis filtering part, and having an outlet hole connected to the flow channel such that domestic water, which includes a remaining part of the raw water that has failed to pass through the reverse osmosis filtering member and failed to be filtered, is discharged from the flow channel, wherein the first and the second flow channel formation caps are configured such that a part of the raw water introduced into the flow channel flows into the purified water flow space through the reverse osmosis filtering member, becomes purified water, and then flows through the purified water flow space, and such that the domestic water, which includes the remaining part of the raw water that has failed to pass through the reverse osmosis filtering member and failed to be filtered, flushes the reverse osmosis filtering member while flowing through the flow channel, and wherein the inlet hole is formed at a radial-direction outer side of the first flow channel formation cap such that the raw water is supplied to a radial-direction outer side of the flow channel of the reverse osmosis filtering part and the outlet hole is formed at a radial-direction inner side of the second flow channel formation cap such that the domestic water is discharged from a radial-direction inner side of the flow channel of the reverse osmosis filtering part, the inlet hole and the outlet hole not being aligned with each other, and the radial-direction being from a central axis of the purified water discharge pipe, or the inlet hole is formed at a radial-direction inner side of the first flow channel formation cap such that the raw water is supplied to a radial-direction inner side of the flow channel of the reverse osmosis filtering part and the outlet hole is formed at a radial-direction outer side of the second flow channel formation cap such that the domestic water is discharged from a radial-direction outer side of the flow channel of the reverse osmosis filtering part, the inlet hole and the outlet hole not being aligned with each other, and the radial-direction being from the central axis of the purified water discharge pipe.

2. The reverse osmosis filtering module of claim 1, wherein the inlet hole and the outlet hole are formed along a circumferential direction on the first flow channel formation cap and the second flow channel formation cap, respectively.

3. The reverse osmosis filtering module of claim 1, wherein the first flow channel formation cap includes a first insertion portion into which the one side of the reverse osmosis filtering part is inserted and which communicates with the inlet hole, and wherein the second flow channel formation cap includes a second insertion portion into which the other side of the reverse osmosis filtering part is inserted and which communicates with the outlet hole.

4. The reverse osmosis filtering module of claim 3, wherein a first sealing space to be filled with a sealing material that seals a corresponding portion of the one side of the reverse osmosis filtering part is formed in a portion of the first insertion portion that does not communicate with the inlet hole, and wherein a second sealing space to be filled with a sealing material that seals a corresponding portion of the other side of the reverse osmosis filtering part is formed in a portion of the second insertion portion that does not communicate with the outlet hole.

5. The reverse osmosis filtering module of claim 4, wherein a first partition wall defining at least a portion of the first sealing space is formed in the first insertion portion, and wherein a second partition wall defining at least a portion of the second sealing space is formed in the second insertion portion.

6. The reverse osmosis filtering module of claim 5, wherein a stepped portion is formed in at least one of the one side and the other side of the reverse osmosis filtering part such that at least parts of the one side and the other side of the reverse osmosis filtering part are inserted into the first sealing space and the second sealing space, respectively, to prevent the sealing material from leaking through the inlet hole or the outlet hole.

7. The reverse osmosis filtering module of claim 1, wherein a through-hole through which the purified water discharge pipe passes is formed on at least one of the first flow channel formation cap and the second flow channel formation cap.

8. A reverse osmosis filter, comprising:
the reverse osmosis filtering module of claim 1; and
a housing configured to accommodate the reverse osmosis filtering module therein, the housing having an introduction port communicating with the inlet hole of the first flow channel formation cap, a purified water discharge port communicating with the opened one side of the purified water discharge path of the purified water discharge pipe, and a domestic water discharge port communicating with the outlet hole of the second flow channel formation cap.

9. The reverse osmosis filter of claim 8, wherein the reverse osmosis filtering module is provided with a sealing member that seals a gap between the reverse osmosis filtering module and the housing to prevent raw water introduced into the introduction port from being discharged to the purified water discharge port or the domestic water discharge port through the gap between the reverse osmosis filtering module and the housing.

10. A reverse osmosis filter, comprising:
the reverse osmosis filtering module of claim 2; and
a housing configured to accommodate the reverse osmosis filtering module therein, the housing having an introduction port communicating with the inlet hole of the first flow channel formation cap, a purified water discharge port communicating with the opened one side of the purified water discharge path of the purified water discharge pipe, and a domestic water discharge port communicating with the outlet hole of the second flow channel formation cap.

11. The reverse osmosis filter of claim 10, wherein the reverse osmosis filtering module is provided with a sealing member that seals a gap between the reverse osmosis filtering module and the housing to prevent raw water introduced into the introduction port from being discharged to the purified water discharge port or the domestic water discharge port through the gap between the reverse osmosis filtering module and the housing.

12. A reverse osmosis filter, comprising:
the reverse osmosis filtering module of claim 3; and
a housing configured to accommodate the reverse osmosis filtering module therein, the housing having an introduction port communicating with the inlet hole of the first flow channel formation cap, a purified water discharge port communicating with the opened one side of the purified water discharge path of the purified water discharge pipe, and a domestic water discharge port communicating with the outlet hole of the second flow channel formation cap.

13. The reverse osmosis filter of claim 12, wherein the reverse osmosis filtering module is provided with a sealing member that seals a gap between the reverse osmosis filtering module and the housing to prevent raw water introduced into the introduction port from being discharged to the purified water discharge port or the domestic water discharge port through the gap between the reverse osmosis filtering module and the housing.

14. A reverse osmosis filter, comprising:
the reverse osmosis filtering module of claim 4; and
a housing configured to accommodate the reverse osmosis filtering module therein, the housing having an introduction port communicating with the inlet hole of the first flow channel formation cap, a purified water discharge port communicating with the opened one side of the purified water discharge path of the purified water discharge pipe, and a domestic water discharge port communicating with the outlet hole of the second flow channel formation cap.

15. The reverse osmosis filter of claim 14, wherein the reverse osmosis filtering module is provided with a sealing member that seals a gap between the reverse osmosis filtering module and the housing to prevent raw water introduced into the introduction port from being discharged to the purified water discharge port or the domestic water discharge port through the gap between the reverse osmosis filtering module and the housing.

16. A reverse osmosis filter, comprising:
the reverse osmosis filtering module of claim 5; and
a housing configured to accommodate the reverse osmosis filtering module therein, the housing having an introduction port communicating with the inlet hole of the first flow channel formation cap, a purified water discharge port communicating with the opened one side of the purified water discharge path of the purified water discharge pipe, and a domestic water discharge port communicating with the outlet hole of the second flow channel formation cap.

17. The reverse osmosis filter of claim 16, wherein the reverse osmosis filtering module is provided with a sealing member that seals a gap between the reverse osmosis filtering module and the housing to prevent raw water introduced into the introduction port from being discharged to the purified water discharge port or the domestic water discharge port through the gap between the reverse osmosis filtering module and the housing.

18. A reverse osmosis filter, comprising:
the reverse osmosis filtering module of claim 6; and
a housing configured to accommodate the reverse osmosis filtering module therein, the housing having an introduction port communicating with the inlet hole of the first flow channel formation cap, a purified water discharge port communicating with the opened one side of the purified water discharge path of the purified water discharge pipe, and a domestic water discharge port communicating with the outlet hole of the second flow channel formation cap.

19. The reverse osmosis filter of claim 18, wherein the reverse osmosis filtering module is provided with a sealing member that seals a gap between the reverse osmosis filtering module and the housing to prevent raw water introduced into the introduction port from being discharged to the purified water discharge port or the domestic water discharge port through the gap between the reverse osmosis filtering module and the housing.

20. A reverse osmosis filter, comprising:
the reverse osmosis filtering module of claim 7; and
a housing configured to accommodate the reverse osmosis filtering module therein, the housing having an introduction port communicating with the inlet hole of the first flow channel formation cap, a purified water discharge port communicating with the opened one side of the purified water discharge path of the purified water discharge pipe, and a domestic water discharge port communicating with the outlet hole of the second flow channel formation cap.

21. The reverse osmosis filter of claim 20, wherein the reverse osmosis filtering module is provided with a sealing member that seals a gap between the reverse osmosis filtering module and the housing to prevent raw water introduced into the introduction port from being discharged to the purified water discharge port or the domestic water discharge port through the gap between the reverse osmosis filtering module and the housing.

* * * * *